(No Model.)
J. L. OEFINGER.
MACHINE FOR CUTTING KEY WAYS.
No. 340,348. Patented Apr. 20, 1886.
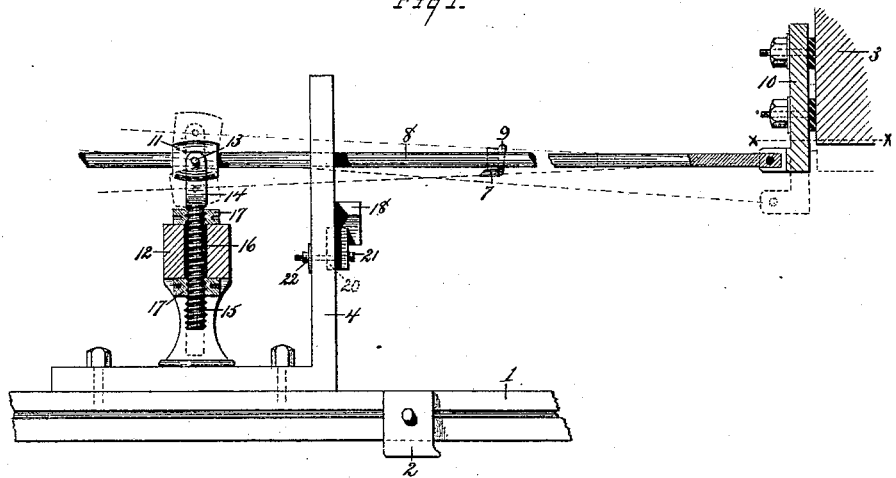
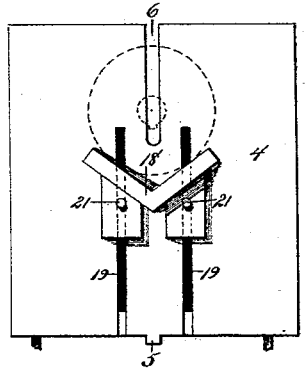
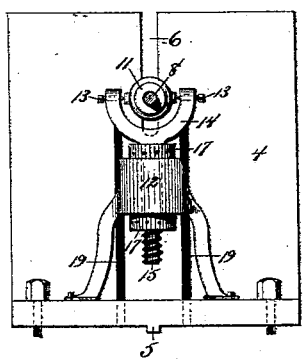
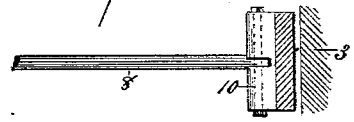
Witnesses —
C. E. Ruggles.
C. E. Tucker.
— Inventor —
John L. Oefinger
By A. M. Wooster
Atty.

UNITED STATES PATENT OFFICE.

JOHN L. OEFINGER, OF NORTH ADAMS, MASSACHUSETTS.

MACHINE FOR CUTTING KEYWAYS.

SPECIFICATION forming part of Letters Patent No. 340,348, dated April 20, 1886.

Application filed February 1, 1886. Serial No. 190,427. (No model.)

*To all whom it may concern:*

Be it known that I, JOHN L. OEFINGER, a citizen of the United States, residing at North Adams, in the county of Berkshire and State of Massachusetts, have invented certain new and useful Improvements in Machines for Cutting Keyways; and I do hereby declare the following to be a full, clear, and exact description of the invention, such as will enable others skilled in the art to which it appertains to make and use the same.

My invention has for its object to provide an adjustable device for cutting key ways or seats, which may be attached to an ordinary metal-planer.

With this end in view, I have devised the simple and novel construction of which the following description, in connection with the accompanying drawings, is a specification.

Figure 1 is a side elevation, partially in section, of the device complete; Fig. 2, a rear elevation of the angle-plate, showing the rest; Fig. 3, a front elevation of the angle-plate and the adjustable box; and Fig. 4 is a detail view illustrating the attachment of the bar to the tool-block.

1 indicates a planer-platen, 2 one of the dogs, and 3 the tool-block, all being of ordinary construction.

4 is an angle-plate, having a tongue, 5, on its bottom, which engages the usual groove in the planer-platen, said angle-plate being secured in any desired position by bolts passing through the angle-plate and into the platen.

6 indicates a central slot through the upright portion of the angle-plate, through which the bar passes.

7 indicates the cutter, which is carried by a bar, 8, and preferably secured thereto by a key, 9. The inner end of this bar is adjustably secured to the tool-block. I preferably pivot this bar to a plate, 10, which is firmly bolted to the tool-block, as shown. The outer end of this cutter-bar is supported in an adjustable box, 11, the opening through said box being of just sufficient size to hold the bar stationary, but at the same time to permit the box to slide freely over the bar as the platen reciprocates.

12 indicates a standard, which is carried by the platen. The box is supported at the ends of pointed screws 13, carried by a yoke, 14, which is provided with a threaded shank, 15. The shank of the yoke passes down through a central opening, 16, and is held at any desired position by nuts 17 above and below the body of the standard. The pointed screws permit the box to be accurately centered relatively to the bar.

In use the pulley, gear, or other piece to be operated upon is supported by a V-shaped rest, 18, which is secured in vertical slots 19, which extend through the angle-plate. I provide the back of the rest with tongues 20, (see dotted lines in Fig. 1,) which extend into slots 19, thus holding the rest firmly against lateral motion. Bolts 21 pass through the rest, the tongues, and entirely through slot 19, and are tightened by nuts 22 upon the front of the angle-plate.

The dotted circle in Fig. 2 indicates the manner in which a pulley, gear, or other piece is supported by the rest. The shape of the rest is such as to center the piece without other devices.

The operation is as follows: The pulley, gear, or other article in which it is desired to cut a keyway is placed upon the rest, and the cutter-bar passed through the central opening in said piece. As stated above, the inner end of the cutter-bar is pivoted to the tool-block, and the outer end is supported by being passed through the adjustable box, as shown. A cutter of suitable size to produce the desired keyway is attached to the bar in any suitable manner. Should it be desired to cut a keyway of equal depth at both ends, the cutter-bar is so adjusted that when the bar has reached a horizontal position a cut of the required depth will have been made in the article, it being of course understood that the tool-block is raised or lowered in any suitable manner—that is to say, it may be lowered automatically or by hand. This, however, forms no portion of my present invention. Should it be desired to cut a keyway deepest upon the inner side—that is, upon the side facing the cutter—it is simply necessary to lower the tool-block below the level of the box, so that the inner end of the bar will be lowest. Should it be desired to cut a keyway deepest at its outer edge—that is, at the edge of the article which lies against the face of the angle-plate—the box should be lowered below the level of the tool-block.

The operation of cutting is accomplished by the ordinary reciprocation of the planer-platen, the cutter-bar sliding freely through the box, and the tool-block being lowered automatically or by hand, as stated above.

It will thus be seen that my improved device enables me to cut a keyway of any width or depth, or of varying depth, wherever it may be desired, the range of work being, so far as I have been able to discover, without limit.

It will of course be understood that I do not limit myself to the exact details of construction shown and described, as they may obviously be widely varied without departing from the spirit of my invention.

I claim—

1. The combination, with a tool-block, a bar pivoted thereto, and a reciprocating platen, of a cutter secured to said bar, a box carried by the platen, which supports the outer end of the bar, and a rest, also carried by the platen, which supports the piece to be operated upon.

2. The cutter, cutter-bar, and rest, in combination with a box which supports the outer end of the bar, but slides freely over it, a yoke provided with a threaded shank, by which the box is carried, standard 12, and nuts 17, whereby the box may be adjusted at any desired position.

3. The cutter, cutter-bar, and adjustable box, in combination with plate 4, secured to a reciprocating platen, and a V-shaped rest adjustably secured to the plate.

4. The cutter, cutter-bar, and rest, in combination with the box, pointed screws 13, the yoke, standards, and nuts 17.

5. The angle-plate having central slot, 6, and slots 19, and rest 18, having tongues 20 and bolts 21, in combination with the cutter, cutter-bar, and adjustable box.

6. The tool-block, plate 10, pivoted thereto, and the cutter and cutter-bar, in combination with an angle-plate secured to a reciprocating platen and provided with a central slot, through which the bar passes, an adjustable work-rest carried by the angle-plate, and an adjustable box carried by a standard upon the platen, which supports the outer end of the bar.

7. The standard, yoke having a threaded shank, and nuts 17, in combination with box 11, held in the yoke by pointed screws, the cutter, cutter-bar, and rest 18.

8. In a keyway-cutter, an adjustable bar supported at both ends and having a cutter attached thereto, in combination with an adjustable work-rest carried by a reciprocating platen.

In testimony whereof I affix my signature in presence of two witnesses.

JOHN L. OEFINGER.

Witnesses:
JAMES DOHERTY,
PERRY G. GARDNER.